United States Patent
Okamura et al.

(12)

(10) Patent No.: US 6,215,278 B1
(45) Date of Patent: Apr. 10, 2001

(54) CAPACITOR MODULE, BANK OF SUCH MODULES, AND STOREHOUSE HOUSING SUCH BANKS

(75) Inventors: Michio Okamura; Masaaki Yamagishi, both of Kanagawa; Akinori Mogami, Tokyo, all of (JP)

(73) Assignees: Jeol Ltd., Tokyo; Okamura Laboratory, Inc.; Kabushiki Kaisha Powersystem, both of Kanagawa, all of (JP)

( * ) Notice: Subject to any disclaimer, the term of this patent is extended or adjusted under 35 U.S.C. 154(b) by 0 days.

(21) Appl. No.: 09/497,716

(22) Filed: Feb. 4, 2000

(30) Foreign Application Priority Data

Feb. 4, 1999 (JP) .................................. 11-27027

(51) Int. Cl.[7] ...................................... H02J 7/00
(52) U.S. Cl. .............................................. 320/119
(58) Field of Search .................... 320/126, 122, 320/166, 116, 119

(56) References Cited

U.S. PATENT DOCUMENTS 5,726,552  *  3/1998  Okamura ............................... 320/126

OTHER PUBLICATIONS

"A Basic Study on Power Storage Capacitor Systems", Michio Okamura, *Electrical Engineering in Japan*, vol. 116, No. 3, 1996, pp. 40–51. No Month.

* cited by examiner

*Primary Examiner*—Shawn Riley
(74) *Attorney, Agent, or Firm*—Webb Ziesenheim Logsdon Orkin & Hanson, P.C.

(57) ABSTRACT

There is disclosed a capacitor module capable of having an improved packing density and, hence, an improved energy storage density. A capacitor bank using such capacitor modules is also disclosed. Furthermore, an electrical energy storehouse using such capacitor banks is disclosed. Supercapacitor cells connected in series are housed in a box-like capacitor module. A heat dissipator is mounted on an end surface of the module. Parallel monitors connected in parallel with the capacitor cells, respectively, are mounted to the heat dissipator. Such capacitor modules are stacked to form a capacitor bank. The heat-dissipating surface of each module is located on the outside of the bank and exposed. The modules are held in the bank so that they can be taken out of the bank individually. Capacitor banks making a pair are located back-to-back such that their heat-dissipating surface face outward. Pairs of capacitor banks arranged in this way are arranged vertically and horizontally via passages and via space permitting the modules to be taken out.

10 Claims, 5 Drawing Sheets

CAPACITOR MODULE, BANK OF SUCH MODULES, AND STOREHOUSE HOUSING SUCH BANKS

BACKGROUND OF THE INVENTION

1. Field of the Invention

The present invention relates to a capacitor module that houses a number of electric double-layer capacitor cells. The invention also relates to a capacitor bank made up of an assemblage of such capacitor modules. Furthermore, the invention relates to an electrical energy storehouse that houses stacks of such capacitor banks to store electrical energy.

2. Description of the Related Art

Electrical storage capacitor storehouses are being developed to store electric power at night and to release it during daytime peak load periods. Where electric energy is stored using secondary batteries, the secondary batteries themselves occupy space. In addition, further space is necessary to maintain and service them. For example, in the case of a large-sized, lead-acid battery, a stirring device and a pump are indispensable. In the case of a sodium-sulfur battery, the use of auxiliary equipment, including a heater and its power supply, is vital. A secondary battery itself has a large energy density. However, where secondary batteries are assembled in a battery room, space necessary for such auxiliary equipment makes the amount of storage energy per unit volume (electric energy storage density) in the room much smaller than the energy density of each battery itself.

On the other hand, an electric double-layer capacitor (also known as a pseudocapacitor, supercapacitor, ultracapacitor, or electrochemical capacitor) can be charged quickly. Furthermore, it can store a large amount of energy with a much longer cycle life. These great advantages cannot be achieved by the conventional secondary batteries.

The present inventors have already proposed an electric energy storage system (known as an energy capacitor system (ECS)) using electric double-layer capacitors (e.g., *Electrical Engineering in Japan,* Vol. 116, No. 3, 1996, Translated from Denki Gakkai Ronbunshi, Vol. 115-B, No. 5, May 1995, pp. 501–510). In an ECS, individual capacitors are connected in series. A parallel monitor acting as a voltage-monitoring control device is connected across each capacitor. Maximum charging is enabled within the withstand voltage of each capacitor. A parallel monitor is connected across each capacitor of a capacitor bank consisting of plural capacitors connected in series. When the charging voltage for the capacitor bank exceeds the set value, the parallel monitor acts to bypass or stop the charging current, thus controlling the state of charge of the capacitors.

In this way, voltage-monitoring control devices are ancillary to the electric energy storage system using electric double-layer capacitors. Therefore, where an electric storage room or storehouse is built using electric double-layer capacitors, the amount of electric energy per unit volume is inevitably much smaller than the energy density of each capacitor itself. In the case of an electric double-layer capacitor, the energy density itself is smaller than those of secondary batteries and, therefore, more careful considerations need to be given.

SUMMARY OF THE INVENTION

The present invention is intended to solve the foregoing problems.

It is an object of the present invention to provide a capacitor module capable of enhancing the electric energy storage density by enhancing the packing density.

It is another object of the present invention to provide a capacitor bank using capacitor modules of the structure described in the immediately preceding paragraph.

It is a further object of the present invention to provide an electric energy storehouse housing stacks of capacitor modules of the structure described in the immediately preceding paragraph.

A capacitor module, in accordance with the present invention, houses plural capacitor cells connected in series within a box-like container. The capacitor module has parallel monitors and a heat dissipator mounted to an end surface of the box-like container. The parallel monitors are connected in parallel with the capacitor cells, respectively, monitor the voltages developed across the capacitor cells, respectively, and control the state of charge of the cells. The parallel monitors are mounted to the heat dissipator.

A capacitor bank, in accordance with the present invention, comprises plural capacitor modules each of which houses plural capacitor cells connected in series within a box-like container. A heat dissipator is mounted to an end surface of the box-like container. The capacitor bank has a holder in which the capacitor modules are stacked over each other and retained there. The capacitor modules are held so as to be capable of being detachable individually. The heat dissipators are located outside the bank and exposed.

An electric storage capacitor storehouse, in accordance with the present invention, comprises a housing and stacks of capacitor modules held in the housing. Each capacitor module houses plural capacitor cells connected in series within a box-like container. A heat dissipator is mounted to an end surface of the box-like container. The capacitor modules are so held that they can be detached individually from the housing. The heat dissipators are located outside the housing and exposed. The capacitor banks make pairs. The capacitor banks making a pair are mounted back-to-back. A space permitting the modules to be removed is formed on the front side of the pair.

Other objects and features of the present invention will appear in the course of the description thereof, which follows.

DESCRIPTION OF THE PREFERRED EMBODIMENTS

Figure 2A:
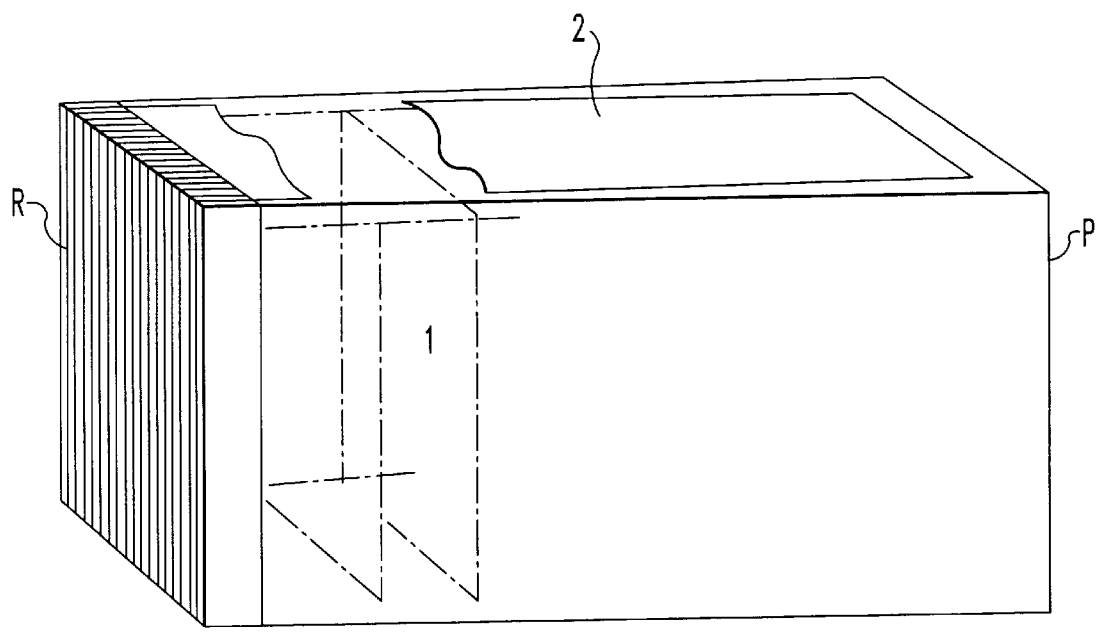
FIG. 2(A) is a perspective view of one example of the capacitor modules shown in FIG. 1.
Figure 2B:
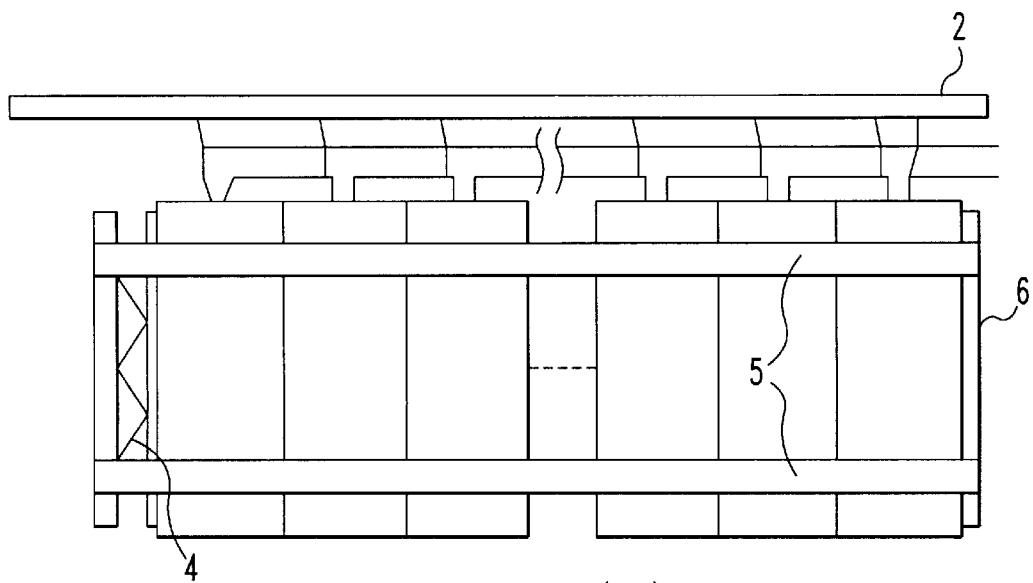
FIG. 2(B) is a vertical cross section of the module shown in FIG. 2(A)
Figure 5:
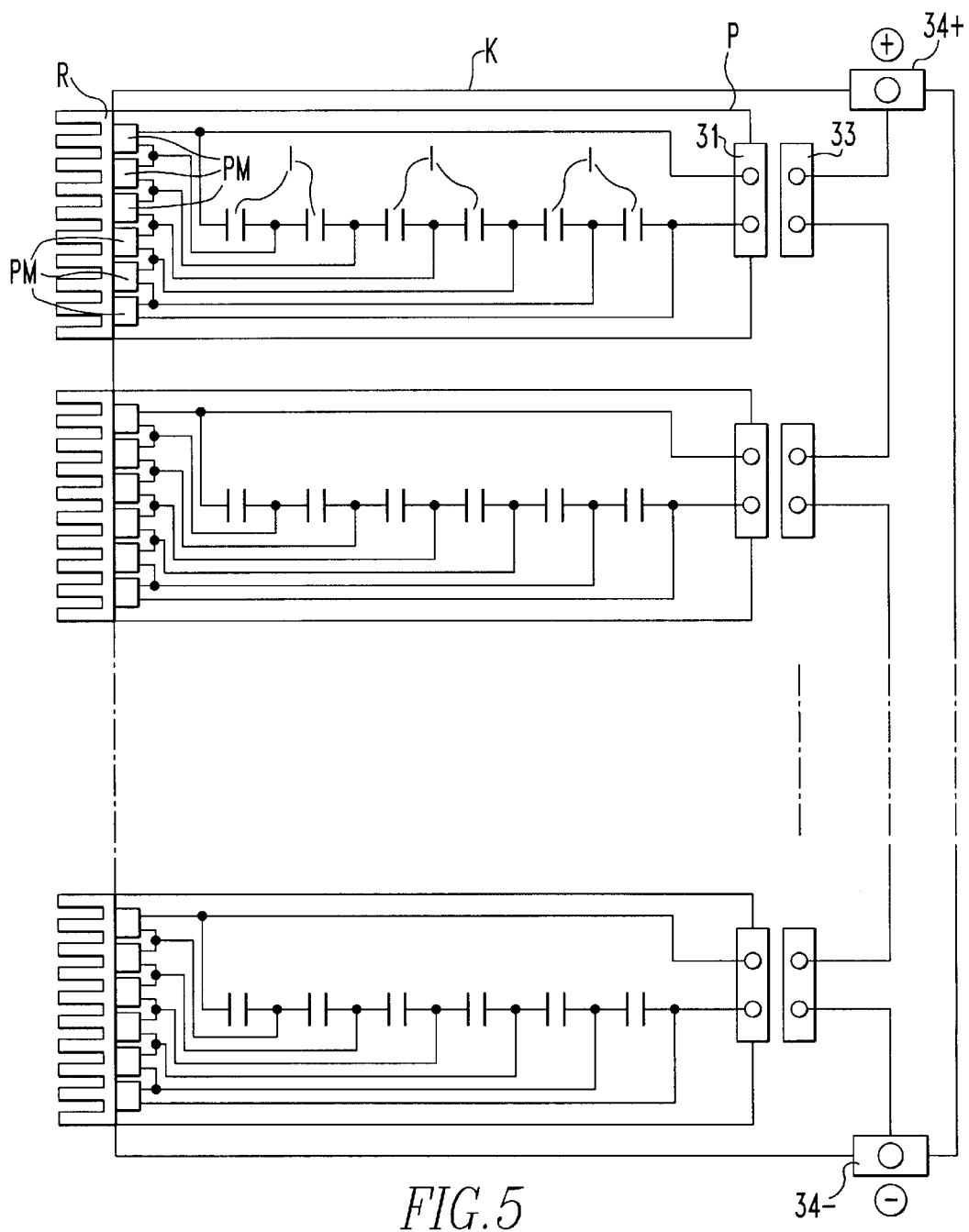
FIG. 5 is a circuit diagram of the interior of a cabinet K shown in FIG. 1.

An electric storage capacitor storehouse, in accordance with the present invention, is made up of capacitor modules, one of which is indicated by P in the perspective view of FIG. 2(A). FIG. 2(B) shows a cell assembly housed in the module P. FIG. 5 is a circuit diagram of the interior of a cabinet in which modules P are combined.

As shown in FIG. 2(A), the module P is shaped into a box-like form. Plural cells 1 and plural parallel monitors PM (e.g., six cells 1 and six parallel monitors PM) are housed in the module P. The cells are connected in series. The parallel monitors are connected in parallel with the cells, respectively. A heat dissipator R having heat-dissipating fins is mounted to the front side of the module P such that the fins face outward. The parallel monitors PM are mounted inside the heat dissipator R. Terminals 31 (see FIG. 5) for connection with an external power-supply circuit are mounted on the rear side of the module P that faces away from the end surface on which the heat dissipator R is mounted.

In an ECS electric storage system, the capacitors generate almost no heat and so the capacitors do not need cooling. However, where the capacitors are set to their initial state, the parallel monitors connected in parallel with the capacitors produce a slight amount of heat. To dissipate this heat, the parallel monitors are mounted to the heat dissipator R. Since only the power control sections (e.g., control transistors) of the parallel monitors generate heat, it is possible to mount only these power control sections to the heat dissipator.

A flexible printed circuit 2 is positioned on any of the top, bottom, right, and left surfaces (e.g., the top surface) of the module P assembled into a box-like form. This printed circuit 2 has interconnects for connecting the cells with the parallel monitors mounted to the heat dissipator R. These interconnects do not need to have a large current capacity. Electronic circuit components (not shown) are installed to monitor the capacitors and to measure the terminal voltages. Of these components, those that produce only a quite small amount of heat can be mounted on the printed circuit 2. Those electronic components that generate a relatively large amount of heat can be mounted to the heat dissipator R. Conductors capable of passing a large current can be used as main current lines connecting the cells. Preferably, the conductors are welded to the cell terminals with minimum distance.

Figure 3A:
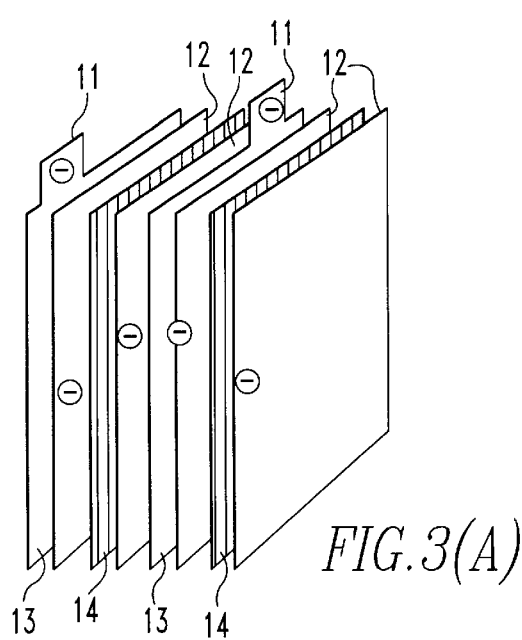
FIG. 3(A) is a perspective view of the interior of a single cell 1 in the capacitor module shown in FIG. 2(A)
Figure 3B:
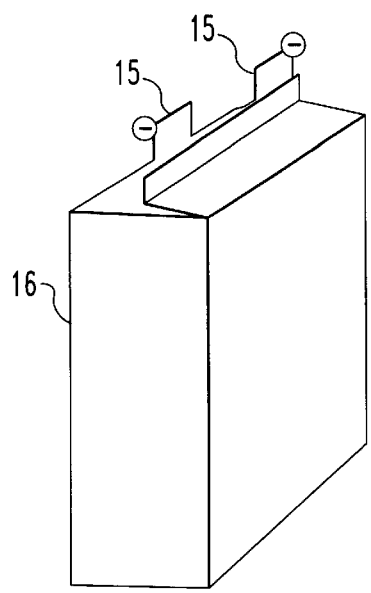
FIG. 3(B) is a perspective view of the single cell 1 whose interior is shown in FIG. 3(A)

FIGS. 3(A) and 3(B) show an example of cells housed in the module P. This illustrated cell has terminal extraction portions 11, polarized electrodes 12, collector electrodes 13, separators 14, electrode terminals 15, and a case 16.

As shown in FIG. 3(A), the cell 1 comprises the polarized electrodes 12, the positive and negative collector electrodes 13, and the separators 14 made of an unwoven fabric or a resin. The polarized electrodes 12 are fabricated by kneading together activated carbon and a conductive material. Each capacitor is fabricated by stacking the positive collector electrode 13, one polarized electrode 12, the separator 14, another polarized electrode 12, and the negative collector electrode 13 in this order, and is impregnated with an organic electrolyte. The cell of this construction is held in the rectangular case 16 fabricated by folding a film not dissolved in the organic electrolyte or bonding the film, as shown in FIG. 3(B). The electrodes 15 are brought out as shown, by making use of the bonded top portion of the container. Normally, each electrode 15 is a pulled out portion of foil or thin sheet of aluminum. Preferably, the pulled out portion of the foil and the film are hermetically welded or bonded together.

Figure 3C:
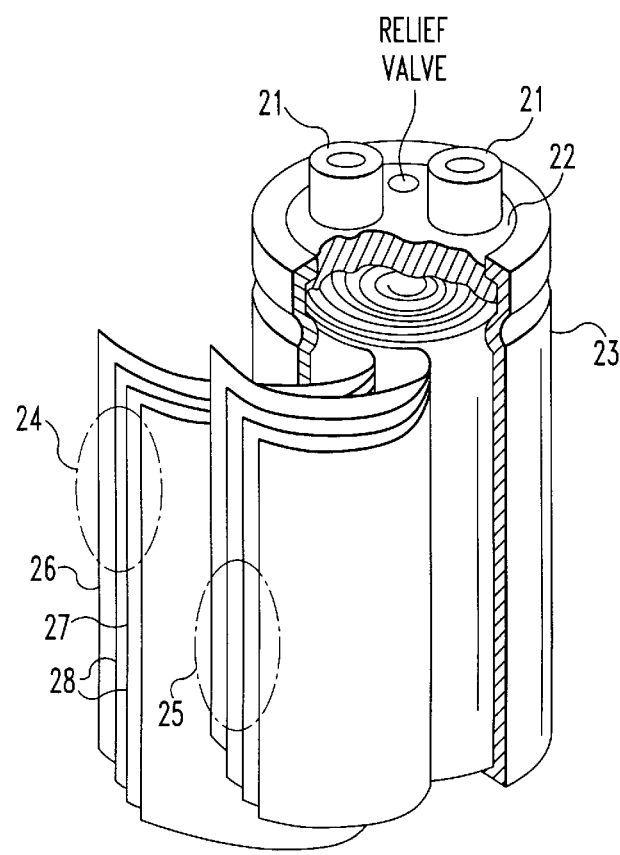
FIG. 3(C) is a perspective view of another example of a cell.

Furthermore, as shown in FIG. 3(C), each cell can also be a cylindrical cell manufactured by winding separators 26, a collector electrode 27, and polarized electrodes 28 within a cylindrical case 23 such that positive electrodes 24 and negative electrodes 25 are overlapped. Also shown are electrode terminals 21 and a cover 22.

The capacitance of this cell obtained by overlapping the electrodes can be enhanced by applying a given pressure (e.g., 1 kg/cm$^2$) in the direction in which the electrodes are overlapped (i.e., in the horizontal direction in the figure). If the container of each cell is a rigid box, this pressure needs to be produced in each individual cell. Furthermore, the box is required to withstand the expanding pressure. Hence, contrivances are necessary. For example, electrodes are housed in a container while applying a pressure to each electrode, the container being designed to withstand the pressure. Alternatively, a pressure is always applied to the container from the outside to counteract the expanding pressure.

With the configuration shown in FIG. 2(B), however, each cell 1 is inserted in a soft film container, and such cells are arranged into a modular structure. Then, a horizontal tightening force is applied by tightening belts 5 to the structure including a cushion material such as a springboard 4. In this way, a necessary tightening pressure is obtained. At this time, rigid pressure plates 6 are made to bear against the opposite ends of the stacked cells. This prevents the cells 1 from being deformed due to the tightening belts 5. Of course, if necessary, a mechanical protective enclosure or a housing facilitating a mounting operation may be mounted around the stacked structure to prevent swelling of the cells and to protect them.

A capacitor module P obtained in this way can have a higher packing factor per unit weight than a structure obtained by inserting and arraying cells in a rigid container and inserting them in an outer housing for the module. Hence, effective use of the volume can be made.

Figure 1:
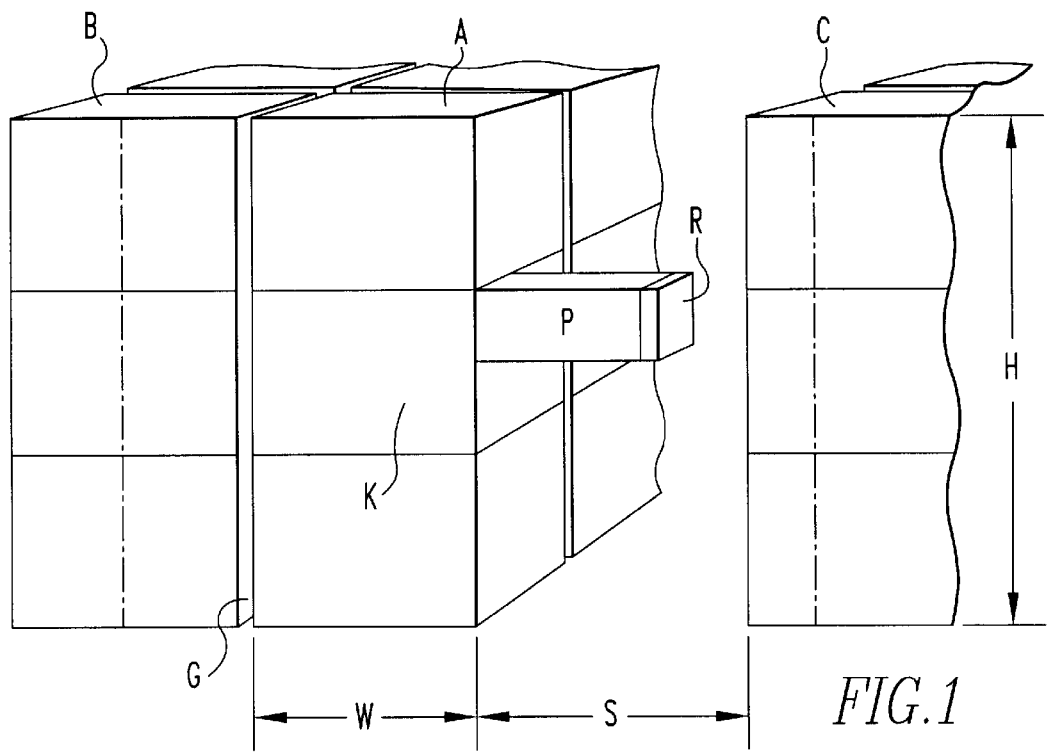
FIG. 1 is a fragmentary perspective view of stacks of capacitor modules housed in an electric storage capacitor storehouse in accordance with the present invention.

Six, for example, of such modules P fabricated as described above are inserted as one set into a cabinet K as shown in FIGS. 1 and 5 such that the modules can be taken out individually. The modules are housed in the cabinet in such a way that heat dissipators R are exposed outside the cabinet. Terminals 33 are mounted in each cabinet to accept the power-supply terminals 31 mounted at the back of each module when each module P is forced into the cabinet.

As shown in FIG. 5, one cabinet K has the terminals 33 accepting the six modules P. In addition, power-supply terminals 34+ and 34− for connection of the cabinet with an external power supply are provided. Since the six terminals 33 are inserted in series between the power-supply terminals 34+ and 34−, six modules P are connected in series within one cabinet.

Figure 6:
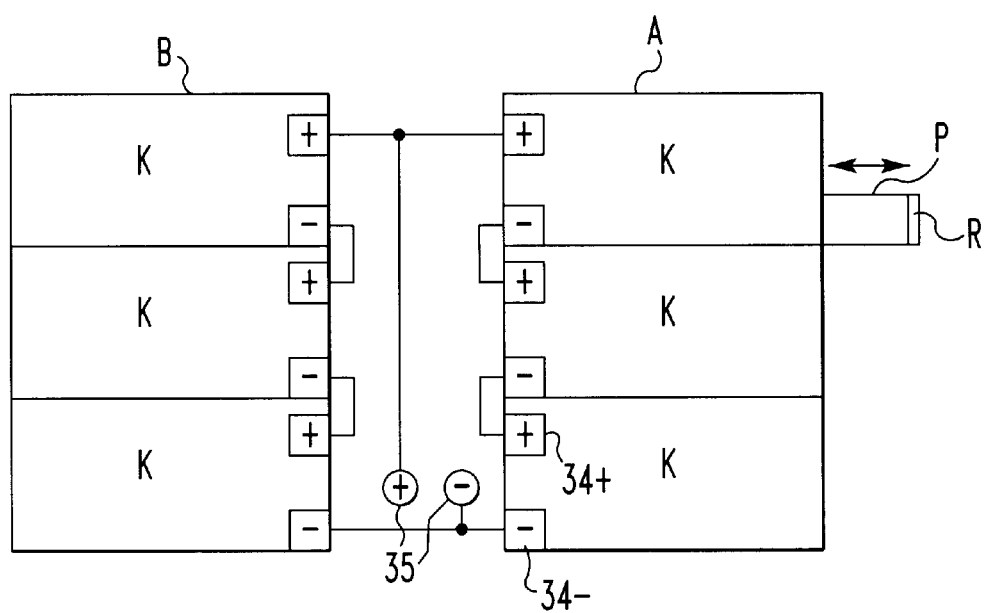
FIG. 6 is a plan view of capacitor banks, in accordance with the present invention, illustrating their arrangement.

As shown in FIG. 1, plural (e.g., three) cabinets K of this construction are stacked on top of each other, forming capacitor banks A, B, C, etc. If three cabinets K are electrically connected in series for each bank as shown in FIG. 6, it follows that 18 modules P are connected in series per bank.

Of these capacitor banks, adjacent two banks, such as A and B, are located back-to-back to leave behind space on the front side of each module P (i.e., on the sides to which the heat dissipators R are mounted).

In FIG. 1, let W be the depth of the cabinet K comprising capacitor banks A–C. Plural pairs of capacitor banks, each consisting of A and B, are arranged toward the depth of the page. A passage having a width S is formed on the front side of the capacitor bank A. If necessary, a gap G is formed between the capacitor banks A and B that are located in a back-to-back relation. Furthermore, pairs of capacitor banks, such as capacitor bank C, are arranged in two dimensions on the opposite sides (i.e., to the right and left) of the passage S, thus forming an electrical energy capacitor storehouse.

The passage S provides space in which pillars and panels necessary to give physical strength to the banks are mounted. Furthermore, conductor cables for interconnections are laid in this space. Heat generated by the modules P is dissipated into this space. Additionally, a serviceman can move in this passage for maintenance. Moreover, the modules P can be pulled out via this space. If the gap G is formed on the backside of the capacitor banks located in a back-to-back relation, power lines 35 for connection of the banks with a power supply (not shown) can be positioned in this gap G, as shown in FIG. 6.

Further, this gap G provides a space into which heat generated by the modules P can be dissipated. The depth W of the capacitor banks A–C can be set to twice the length of each module P, and the modules P can be arranged back-to-back such that the heat-dissipating surfaces of the capacitor banks A–C face the passage S and the gap G. This can enhance the packing density of the electrical energy storehouse and, hence, the packing density of the modules P. Additionally, the end surfaces on which the heat dissipators R of the modules P are mounted can make end surfaces. Furthermore, heat dissipators R can be mounted on both front and rear surfaces of each module.

Figure 4:
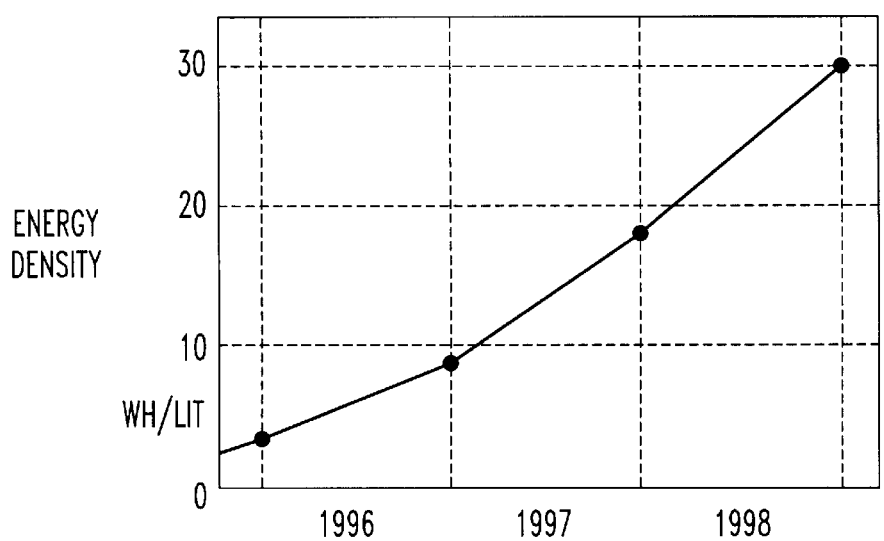
FIG. 4 is a graph of the energy densities of ECS capacitors manufactured in different years, illustrating variations of the energy densities.

FIG. 4 is a graph illustrating the variations of the energy densities of ECS capacitors manufactured in different years. As can be seen from this graph, the energy density per unit volume of the ECS capacitor has been improved greatly but is lower than the nominal energy density of secondary batteries. In the case of batteries, each cell has a high energy density. However, long cycle life cannot be expected. Where secondary batteries are installed in practice, large space is occupied as mentioned previously. In addition, they are open to the atmosphere and emit vapor containing sulfuric acid. Furthermore, heavy batteries having a large density of 3.5 cannot be stacked at a high density. Unleaded secondary batteries are in a similar situation. Where large capacity is secured, it is difficult to obtain hermiticity. Depending on the kinds of batteries, a stirring device, pipes for addition of water or liquid, or a cooling device is necessary. A sodium-sulfur (NAS) battery needs a heating mechanism also.

In an ECS capacitor, the capacitor itself can neglect generation of heat and space for supplementing liquid. If space for passing conductors is present, the density is 1.2–1.3, which is only half or one-third of the densities of secondary batteries. Because supercapacitors are light, they can be easily stacked. An electrical energy storehouse having a greatly improved packing density can be accomplished. In the present invention, the amount of heat generated by supercapacitors is small compared with the total amount of electrical energy stored. Heat-generating portions (i.e., parallel monitors) are not mounted inside but rather located at the front sides of capacitor banks. This prevents conduction of heat to the supercapacitors; otherwise, the temperatures of the supercapacitors would be raised locally. Furthermore, heat dissipation is facilitated. Moreover, the modules can be pulled out individually. Therefore, only defective ones of numerous supercapacitors can be exchanged. In addition, normal inspection and servicing can be easily done from the passage.

It is to be understood that the present invention is not limited to the embodiments described above but rather various changes and modifications are possible. For example, in the embodiments described above, modules can be taken out and exchanged. For this purpose, it is desired to mount mechanisms, such as rails, permitting the modules to slide inside the cabinet. If capacitor banks arranged back-to-back are placed on a movable carriage, the passage S shown in FIG. 1 can be narrowed. This enables more capacitor banks to be mounted in the same space. In this configuration, capacitor banks are moved as the need arises. The space S in front of a capacitor bank that needs to be serviced can be widened.

If a tall cabinet is used, a large number of capacitor modules can be housed in one cabinet. A capacitor bank can be formed by one cabinet.

As can be understood from the description provided thus far, the present invention provides a capacitor module having an improved packing density and an improved electrical energy storage density. The invention also provides a capacitor bank using such capacitor modules. Furthermore, the invention provides an electrical energy capacitor storehouse using such capacitor banks.

Having thus described our invention with the detail and particularity required by the Patent Laws, what is desired protected by Letters Patent is set forth in the following claims.

What is claimed is:

1. A capacitor module having plural capacitor cells connected in series within a box-like container, said capacitor module comprising:

parallel monitors connected in parallel with said capacitor cells, respectively, to monitor voltages developed across said capacitor cells, respectively, and to control state of charge of said capacitor cells; and a heat dissipator mounted to an end surface of said box-like container, said parallel monitors being mounted to said heat dissipator.

2. The capacitor module of claim 1, wherein said box-like container has another end surface having terminals for introducing a charging current from outside.

3. The capacitor module of claim 1 or 2, wherein a printed-circuit board having conductive interconnects for connecting said capacitor cells with said parallel monitors is mounted within said box-like container.

4. A capacitor bank having plural capacitor modules each having plural capacitor cells connected in series within a box-like container and a heat dissipator mounted to an end surface of said box-like container, said capacitor bank comprising:

a holder in which said capacitor modules are stacked and held in such a way that they can be taken out individually; and said heat dissipator being located on the outside of the holder and exposed.

5. The capacitor bank of claim 4, wherein each of said capacitor modules has terminals on an end surface of said box-like container to introduce a charging current from outside, and wherein said holder has receiver terminals to be bonded to the terminals of said capacitor modules and terminals for connection of said receiver terminals with an external power supply.

6. The capacitor bank of claim 4 or 5, wherein said capacitor modules are held by said holder such that they can be pulled out in a direction, and wherein said heat dissipator is mounted on one surface of said capacitor module or said heat dissipator and a similar heat dissipator are mounted on two surfaces that are spaced from each other in said direction in which said capacitor modules can be pulled out.

7. An electrical energy capacitor storehouse comprising plural capacitor banks, each of said capacitor banks having a holder that houses stacks of capacitor modules, each of said capacitor modules having plural capacitor cells connected in series within a box-like container and a heat dissipator mounted to an end surface of said box-like container, said electrical energy capacitor storehouse comprising:

said capacitor modules being held such that they can be taken out of said holder individually;

said heat dissipator being held so as to be exposed; and said capacitor banks forming pairs of capacitor banks, two capacitor banks forming each pair being located back-to-back, leaving behind space on its front side to permit said modules to be pulled out.

8. The electrical energy capacitor storehouse of claim 7, wherein each of said capacitor modules has terminals on an end surface of said box-like container to introduce a charging current from outside, and wherein said holder has receiver terminals to be bonded to the terminals of said capacitor modules and terminals for connection of said receiver terminals with an external power supply.

9. The electrical energy capacitor storehouse of claim 7 or 8, wherein said capacitor modules are held by said holder such that they can be pulled out in a direction, and wherein said heat dissipator is mounted on one surface of said capacitor module or said heat dissipator and a similar heat dissipator are mounted on two surfaces that are spaced from each other in said direction in which said capacitor modules can be pulled out.

10. The electrical energy capacitor storehouse of claim 7 or 8, wherein a gap is formed between back surfaces of capacitor banks located back-to-back.

\* \* \* \* \*